(12) United States Patent
Goidich et al.

(10) Patent No.: US 6,430,914 B1
(45) Date of Patent: Aug. 13, 2002

(54) COMBINED CYCLE POWER GENERATION PLANT AND METHOD OF OPERATING SUCH A PLANT

(75) Inventors: Stephen J. Goidich, Palmerton; Aku Rainio, Bethlehem, both of PA (US)

(73) Assignee: Foster Wheeler Energy Corporation, Clinton, NJ (US)

( * ) Notice: Subject to any disclaimer, the term of this patent is extended or adjusted under 35 U.S.C. 154(b) by 0 days.

(21) Appl. No.: 09/606,024

(22) Filed: Jun. 29, 2000

(51) Int. Cl.[7] ................................................ F02G 3/00
(52) U.S. Cl. .................. 60/39.02; 60/39.12; 60/39.182; 122/7 R
(58) Field of Search .............................. 60/39.02, 39.12, 60/39.137; 122/4 D, 7 R, 7 B

(56) References Cited

U.S. PATENT DOCUMENTS

| | | | |
|---|---|---|---|
| 3,986,348 A | 10/1976 | Switzer, Jr. | ........... 60/39.02 |
| 4,355,601 A | 10/1982 | Hattiangadi | ............... 122/4 |
| 4,441,435 A | 4/1984 | Miyamoto | ............ 110/245 |
| 4,470,255 A | 9/1984 | Rowlands et al. | ...... 60/34.12 |
| 4,996,836 A | 3/1991 | Reh et al. | ............. 60/39.02 |
| 5,440,871 A | * 8/1995 | Dietz et al. | ............ 60/39.02 |
| 5,469,698 A | * 11/1995 | Garcia-Mallol | ........ 60/39.02 |
| 5,632,143 A | * 5/1997 | Fisher et al. | ......... 60/39.182 |
| 5,713,195 A | * 2/1998 | Bronicki et al. | ........ 60/39.02 |

FOREIGN PATENT DOCUMENTS

| | | |
|---|---|---|
| DE | 28 49 691 | 5/1980 |
| DE | 36 12 888 | 10/1987 |
| GB | 2 095 762 | 10/1982 |
| WO | 97/09515 | 3/1997 |

* cited by examiner

*Primary Examiner*—Charles G. Freay
(74) *Attorney, Agent, or Firm*—Fitzpatrick, Cella, Harper & Scinto

(57) ABSTRACT

A combined cycle power generation plant includes a boiler for producing steam, the boiler including a furnace for combusting first fuel to produce flue gas, a back-pass for receiving the produced flue gas and a flue gas duct for passing the flue gas from the back-pass to the environment, a process gas supply for supplying processed gas to the furnace, a steam turbine for receiving and being driven by the steam to generate power, a combustor for combusting a second fuel to produce exhaust gas, a gas turbine for expanding the exhaust gas from the combustor to generate power and for passing the exhaust gas to the process gas supply. The boiler is designed to provide effective steam production and low emissions to the environment in first operating conditions of the combustor when using exhaust gas alone or as a major portion of process gas being supplied to the boiler.

24 Claims, 1 Drawing Sheet

COMBINED CYCLE POWER GENERATION PLANT AND METHOD OF OPERATING SUCH A PLANT

BACKGROUND OF THE INVENTION

The present invention relates to a combined cycle power generation plant, and a method of operating such a plant, the plant comprising a boiler with a furnace for combusting a first fuel to produce steam, a steam generator driven by the steam to generate power and a combustor for combusting a second fuel to produce exhaust gas, which is expanded in a gas turbine to generate power and passed as a process gas to the furnace. The boiler is especially designed by taking into account the characteristics of the exhaust gas from the gas turbine as a process gas in order to render possible effective steam production with low emissions. The present invention addresses a problem of maintaining high performance of the boiler under varying operating conditions of the gas turbine combustor, including an operating mode in which the gas turbine combustor is not in use.

The combined cycle power generation plant may also comprise a gasifier to produce fuel gas and combustible char. The char may be used as the first fuel in the furnace of the boiler and the fuel gas as the second fuel in the gas turbine combustor. Thus, the plant can comprise a plurality of, such as two or three, separate systems, e.g., a boiler with a furnace, a gas turbine with a combustor and possibly a gasifier, which all are normally used together as an integrated system. The boiler is preferably a fluidized bed boiler, but it can also be a suspension boiler or some other type of boiler. The gasifier is preferably a pressurized fluidized bed gasifier, but it can also be of some other type. Both the gasifier and the combustor are preferably operated as circulating fluidized bed (CFB) systems.

U.S. Pat. No. 3,986,348 and No. 4,470,255 and Great Britain Patent No. 2,095,762 disclose combined cycle power plants, in which a pressurized gasifier, a gas turbine and a fluidized bed boiler are integrated so that fuel gas produced in the gasifier is combusted in a combustor of the gas turbine and the exhaust gases from the gas turbine are led to the fluidized bed boiler to function as a process gas, and char produced in the gasifier is combusted in the furnace of the fluidized bed boiler. In these types of plants, the particles in the product gas of the gasifier have to be removed before the gas is passed to the gas turbine, but most of the gaseous emissions can be removed at or downstream of the furnace of the CFB boiler, which renders possible cost-effective manufacturing and operation of the system.

In order to keep the emission level low, the amount of oxygen in the process gas has to be closely connected to the fuel feed rate. When compared to using air as combustion gas, the gas turbine exhaust gas is lean, including typically about 10 to about 15% by volume of oxygen, and hot, having a typical temperature of about 500 to about 600° C. Thus, when using the gas turbine exhaust gas as combustion gas, the flow rate of the combustion gas is high, which has to be taken into account when designing the boiler. Generally, the cross-sectional area of the furnace has to be large, the means for supplying process gas, e.g., the grid of a fluidized bed boiler, has to allow a high gas flow rate, and more heat transfer surfaces than normal have to be located in the back-pass of the boiler.

In these kinds of systems, the quantity and quality of the exhaust gas may strongly depend on the operating conditions of the gas turbine combustor. Thus, without special precautions, the performance of the boiler may vary under different operating conditions of the gas turbine combustor, and the efficiency of the system and the emissions released to the environment may, in some conditions, be far from optimal.

There may be a need to run the system in different operating modes, e.g., when having the gasifier down because of regular maintenance. The power should then be generated, e.g., by means of the boiler system alone, without having gas turbine exhaust gas available. If, under such operating conditions, fresh air is used as the process gas in the boiler, it may be impossible to gain optimal or even acceptable performance. By using optimal process gas flow, good bed temperature can be achieved, but, on the other hand, high excess air is produced, which results in a low boiler efficiency and high NOx emissions. Another alternative would be to use low excess air, but that would in turn lead to too high a bed temperature and very high $SO_2$ emissions.

SUMMARY OF THE INVENTION

It is an object of the present invention to provide a combined cycle power generation plant, including a gas turbine combustor and a boiler, which can provide high performance such as high efficiency and low emissions under (i) varying operating conditions of the combustor or (ii) an operating condition in which the combustor is not in use. It is also an object of the present invention to provide a method of using such a power generation plant.

In order to achieve these and other objects of the present invention, a combined cycle power generation plant and a method of using such a power generation plant are provided, as described in the independent claims.

In one aspect, the present invention provides a method of operating a combined cycle power generation plant that includes providing a boiler having a furnace for combusting a first fuel at a first temperature to produce flue gas and for producing steam, the boiler having an optimal performance in terms of steam production and emissions to the environment, wherein the first temperature provides an optimal temperature, conducting the flue gas through a flue gas duct to the environment, supplying process gas to the furnace at a first mass flow rate, the first mass flow rate providing an optimal mass flow rate, driving a steam turbine by the steam to generate power, combusting, in a combustor, a second fuel to produce exhaust, expanding the produced exhaust gas in a gas turbine to generate power, passing the exhaust gas from the gas turbine to the process gas supply, recirculating a portion of the flue gas from the flue gas duct to the process gas supply, controlling the rate of recirculation of the flue gas by a first controller, supplying fresh air to the process gas supply, controlling the rate of fresh air supply by a second controller, supplying a selected amount of first fuel to the furnace, supplying a selected amount of second fuel to the combustor, and the boiler having, in first operating conditions of the combustor, the optimal performance when the first and second controllers minimize the rate of flue gas recirculation and fresh air supply, respectively, and the exhaust gas is used alone or as a major portion of the process gas, and controlling in conditions other than the first operating conditions of the combustor, the first and second controllers to obtain at least nearly the optimal performance of the boiler.

In another aspect, the present invention provides a combined cycle power generation plant that includes a boiler for producing steam, the boiler including a furnace for combusting a first fuel to produce flue gas, a back-pass for receiving the produced flue gas and a flue gas duct for passing the flue gas from the back-pass to the environment, a process gas supply for supplying the process gas to the furnace, a steam turbine for receiving and being driven by the steam to generate power, a combustor for combusting a second fuel to produce exhaust gas, a gas turbine for expanding the exhaust gas from the combustor to generate power and for passing the exhaust gas to the process gas supply, a return line for recirculating a portion of the flue gas from the flue gas duct to the process gas supply, a first controller for controlling a rate at which the flue gas is recirculated in the return line, a supply for supplying fresh air to the process gas supply, a second controller for controlling a rate at which the fresh air is supplied by the supply, and a controller for controlling the first and second controllers so as to maintain at least nearly optimal performance of the boiler under different operating conditions of the combustor. The boiler has a geometry and heat transfer surfaces located so as to optimize performance in terms of steam production and emissions to the environment, when using exhaust gas alone or as a major portion of the process gas being supplied to the boiler.

It is assumed above that the first operating conditions correspond to normal operating conditions of the system, which are used as the basis when designing the system. In these conditions, unmixed gas turbine exhaust gas, or exhaust gas mixed with a small amount of air and recirculated flue gas, typically at most about 10% by volume, is used as process gas in the furnace of the boiler. The typical flow rate and oxygen content of the exhaust gas are taken into account when designing the geometry of the boiler and the location of the heat transfer surfaces within the boiler. Because the characteristics of the exhaust gas may vary under different operating conditions of the gas turbine combustor, a primary goal of the present invention is to provide a method and a system that compensate for the changes of the characteristics of the process gas supplied into the boiler under varying operating conditions of the gas turbine combustor. According to a preferred embodiment of the present invention, this goal is achieved by controlling the supply of fresh air to the lower portion of the boiler and the recirculation of flue gas from the flue gas duct into the lower portion of the boiler, so that under varying operating conditions of the combustor, optimal performance of the boiler, in terms of steam production and emissions to the environment, is obtained.

Usually, air is used as a fluidizing gas and process gas of a fluidized bed combustor. The amount of air introduced into the combustor is determined on the basis of the amount of oxygen needed for the combustion. U.S. Pat. No. 4,355,601 and No. 4,441,435, however, disclose mixing of the fluidizing gas with an amount of recirculated flue gas in order to control, e.g., the bed temperature or residual $O_2$ in the flue gas, when the boiler load or the characteristics of the fuel introduced into the boiler is changed. The embodiment of the present invention described above differs from the previously known forms of flue gas recirculation in that, in the present case, the need for controlling the process gas is not due to something directly affecting the boiler, but something primarily affecting the gas turbine combustor of the power plant, and influences the boiler only through the gas turbine exhaust gas. More specifically, the present boiler is designed to be used with lean exhaust gas as the process gas, and the supply of fresh air and the recirculation of flue gas are performed in order to maintain the characteristics of the process gas optimal under different conditions.

An example of using the present invention is to regulate the mass flow of the process gas in varying ambient air temperatures. It is typical for gas turbine systems for the volume flow rate of the inlet air to be nearly constant under different conditions. This means that the mass flow rate, and also the amount of oxygen, in the exhaust gas of such systems may be at a high ambient temperature clearly lower than that at lower temperatures. According to the present invention, it is possible to compensate for the decreasing exhaust gas flow by providing a proper amount of fresh air and recirculated flue gas.

According to a preferred embodiment of the present invention, the power generation plant may also comprise a high pressure gasifier for gasifying a third fuel to produce fuel gas, which can be used as the second fuel. The gasifier is preferably a fluidized bed gasifier, fluidized with air. An efficient power generation cycle is provided when char, which is a combustible residue of the gasification process, is used for fueling a fluidized bed boiler.

The changes of the operating conditions of the gas turbine combustor may be gradual changes of the operating environment or more drastic changes of the operating conditions. The conditions affecting the operation of the combustor, e.g., ambient air temperature, pressure and/or humidity, can be measured, and the controlling of the first and second controllers can be based on the measured conditions.

A sudden change in the operating conditions takes place, e.g., when the fuel used in the gas turbine combustor is changed to another or the total plant is switched into another operating mode. The biggest possible change is from a mode in which the gas turbine combustor is in operation to another mode in which the gas turbine combustor is not used. After such a change, the entire process gas has to be produced from fresh air and recirculated flue gas. Then, according to the present invention, the supply of fresh air and the recirculation of flue gas are controlled so as to simulate the characteristics of the original process gas. However, when using a mixture of recirculated flue gas and fresh air instead of gas turbine exhaust gas as the process gas, the temperature of the process gas is several hundreds of degrees Celsius lower than originally. If an amount of steam production is required to be unchanged, the fuel feeding rate to the furnace has to be increased, and the required amount of oxygen changes correspondingly.

If the combined cycle power generation plant comprises a gasifier, it is possible to change the operating mode from a mode including the use of the gasifier for producing the fuel to the gas turbine combustor to another mode in which a gasifier is not used, but instead, natural gas, e.g., is used for fueling the gas turbine combustor. In this case, the change of the process gas is not necessarily very large. Nevertheless, according to the present invention, the change of the characteristics of the process gas can be reduced.

According to a preferred embodiment of the present invention, the characteristics of the process gas and/or the performance of the boiler is/are measured, and the flow rates of the components of the process gas are controlled on the basis of at least one of these measurements. As an example, the oxygen content of the flue gas or the oxygen content and flow rate of the process gas can be measured and used as the basis of the control.

An actual goal in controlling the boiler is to achieve optimal performance of the boiler in terms of steam production and emissions to the environment.

A principal factor affecting the boiler performance is the combustion temperature. Thus, it is possible to measure a temperature in the boiler, e.g., the temperature in the lower portion of the furnace, and use the measured temperature as the basis for controlling the first and second controllers. Correspondingly, one can use measurements of emissions released to the environment as a basis for the initial adjustment of the process gas control. Also, the pressure, flow and/or temperature of the produced steam can be used for controlling the flow rates of fresh air and recirculated flue gas.

BRIEF DESCRIPTION OF THE DRAWING

The drawing schematically illustrates a combined cycle power generation plant constructed in accordance with the present invention.

DETAILED DESCRIPTION OF A PREFERRED EMBODIMENT

Figure 1:
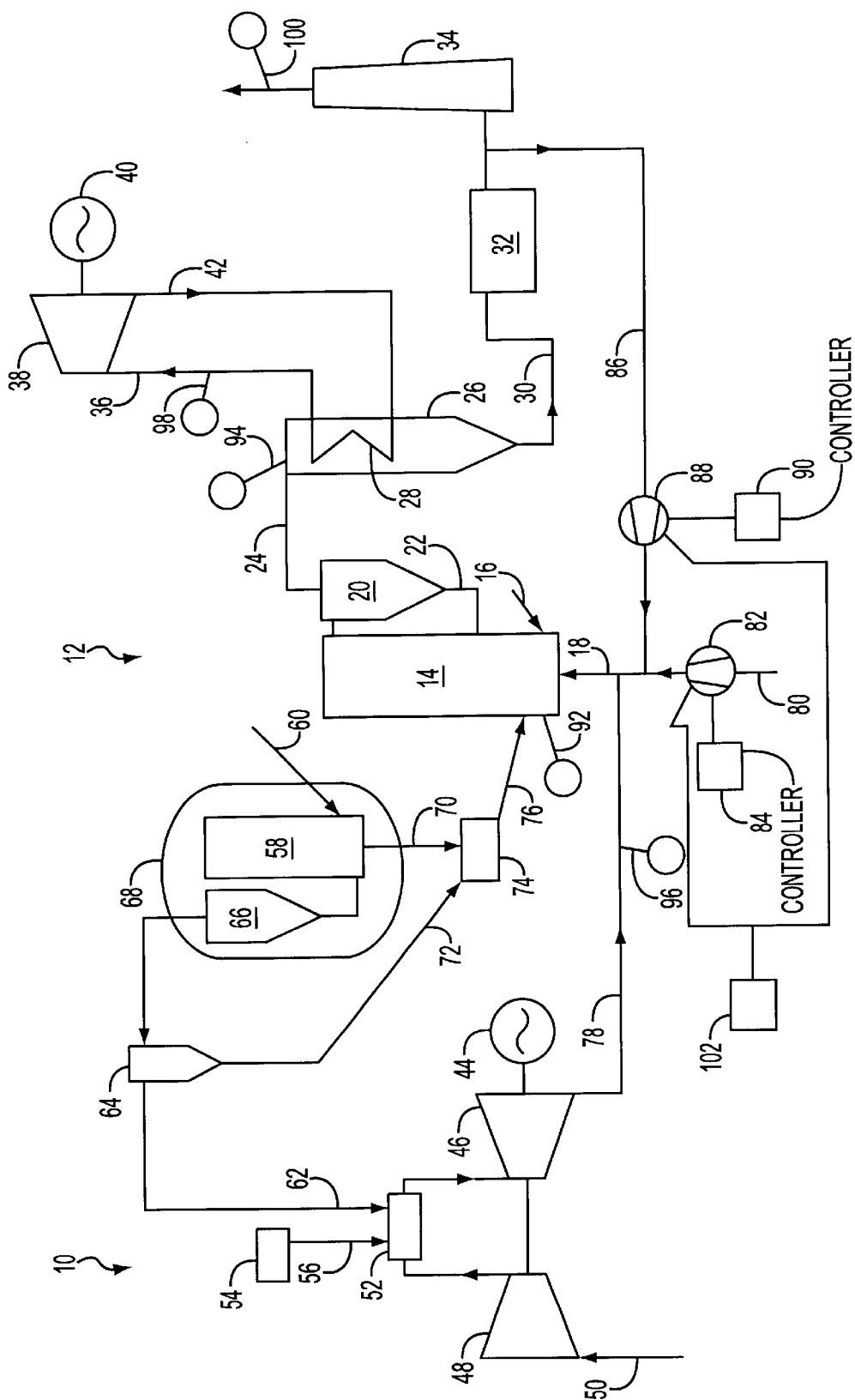

With reference to the drawing, a combined cycle power generation plant generally designated by reference number 10 comprises a preferred embodiment of the present invention. Power plant 10 includes a circulating fluidized bed ("CFB") boiler 12 having a furnace 14 into which combustible material, non-combustible material and process gas are fed. An arrow 16 in the drawing indicates a preferred location wherein combustible materials, which are preferably coal or a similar solid fuel, are introduced. In furnace 14, the bed is maintained in a fluidized state by having the correct amounts of bed material and flow of process gas. The furnace 14 is provided with an inlet 18 for supplying process gas into the lower portion of the furnace 14.

The fluidized bed boiler 12 combusts the fuel material, typically at a temperature of about 850 to about 900° C., and produces a hot exhaust gas output. The hot flue gas is brought from furnace 14 to a hot cyclone separator 20. In the separator 20, solid particles are separated from the flue gas for return via a return duct 22 to the lower portion of furnace 14. The solid particles may be passed through fluidized bed coolers or the like prior to returning to the furnace.

Flue gases from the hot cyclone separator 20 pass along by way of a duct 24 to a back-pass 26. A heat exchanger 28 is symbolically shown in the back-pass 26 for producing steam. Actually, the boiler 12 comprises a steam generation system, which includes at least an economizer, evaporating surfaces and superheating surfaces, which can be located in several generally known ways in different parts of boiler 12. From the back-pass 26, the flue gases are passed along a flue gas line 30 to a dust separator 32 and via a stack 34 to the environment, typically at a temperature of about 150° C. The flue gas line 30 may also comprise means for reducing gaseous pollutants from the flue gas, but these are not shown in the drawing.

The steam generated in boiler 12 is directed through a supply line 36 to a steam turbine 38, which is connected to an electric generator 40. A return line 42 leads water from steam turbine 38 back to boiler 12. Return line 42 includes, as is generally known, but not shown in the drawing, at least a condenser, feedwater pumps and feedwater heaters.

A second electric generator 44 is connected to a gas turbine 46, thus providing the second cycle of the combined cycle power generation plant 10. The gas turbine 46 is operated by compressed air provided by an air compressor 48, which is operatively connected to and driven by gas turbine 46. Air compressor 48 receives ambient air from an air inlet line 50.

The compressed air is conducted to a gas turbine combustor 52, where, normally, a combustible gas is burned. The combustible gas may be provided from a natural gas source 54 along a natural gas inlet line 56. In some cases, the gas turbine combustor 52 can be designed to utilize other fuels, such as light or heavy oil.

Combustible gas may also be provided from a gasifier 58. Gasifier 58 is used to gasify fuel, such as coal or heavy oil residues, introduced to the gasifier with a fuel inlet line 60. The gasifier 58 produces an output of product gas, i.e., syngas, which is provided to the gas turbine combustor 52 along a syngas inlet line 62. The syngas inlet line 62 preferably comprises a dust separator 64, typically a hot gas filter, for removing from the syngas all particles which could harm gas turbine 46.

Gasifier 58 is preferably of a circulating fluidized bed type, including means to fluidize a bed of fuel and inert bed material, and a separator 66 for separating entrained bed material from produced syngas. The gasifier is preferably located in a pressure vessel 68, in order to be operated at an elevated pressure. The gasifier may be pressurized by compressor 48, or a separate compressor, not shown in the drawing.

The combined cycle power plant 10 also operates efficiently with gasifier 58, which produces a considerable amount of combustible solid residue, e.g., char. The char from gasifier 58 and dust from dust separator 64 can be led to the fluidized bed boiler 12 via inlet lines 70 and 72, respectively. Because the char from gasifier 58 and dust from dust separator 64 are at an elevated pressure, they are first collected in a pressure releasing means 74, such as a lock hopper, and from there to the furnace 14 via inlet line 76.

The output from the gas turbine 46 is provided via an exhaust line 78 to inlet line 18 for providing process gas to furnace 14. Thus, the gas turbine combustor 52 is used as the process gas source for the CFB boiler 12, which reduces the need for emission reduction efforts in the gas turbine cycle. Since the gas turbine exhaust gas is going through the CFB boiler 12, emission reduction can be taken care of in the CFB.

Inlet line 80 for providing ambient air at a rate controlled by a controller 82, typically, a fan with controlling means 84, is also connected to inlet line 18 for providing process gas to furnace 14. A return line 86 for providing flue gas recirculated from the flue gas duct 30 at a rate controlled by a controller 88, typically, a fan with controlling means 90, is also connected to the process gas inlet 18.

Under normal operating conditions, the combined cycle power generation plant 10 is operated so that the exhaust gas from gas turbine 46 through exhaust gas line 78 is used unmixed, or mixed with a small amount, typically at most 10% by volume, of ambient air through inlet line 80 and recirculated flue gas through return line 86, as the process gas for furnace 14. Because this gas is lean and hot, containing typically about 12% by volume of oxygen at a temperature of about 600° C., boiler 12 is designed to function with high performance when using this kind of process gas. Because of the required large process gas flow rate, the mean cross section of the furnace is typically at least 15% larger, preferably, about 25% larger, than in similar conventional boilers using air as the process gas and having the same steam production capacity. In order to cool the process gas downstream of the furnace 14, the heat transfer area in the back-pass 20 is correspondingly at least 15% larger, preferably, about 25% larger, than in similar conventional boilers.

When the operating conditions of gas turbine combustor 52 change, the quantity and quality of the exhaust gas in exhaust gas line 78 may vary. Then, according to the present invention, controller 84 and/or 90 can be used to restore the mass flow rate and oxygen content of the process gas characteristics. As in all boilers, the actual required flow rates of the process gas and oxygen depend on the load of the boiler 12. However, the present invention provides the ability to maintain high performance of boiler 12 under all load conditions, even under varying operating conditions of gas turbine combustor 52.

Ambient air temperature, pressure and humidity, which affect the operation of the combustor, are measured by a sensing device 102. The control of the flow rate of controllers 82 and 88 can be based on these measurements. The control of the flow rate controllers 82 and 88 may be based on the temperature of furnace 14 or the oxygen content of the flue gas, measured by sensors 92 and 94, respectively. It is also possible to measure the flow rate, oxygen content and temperature of the exhaust gas in line 78 by a measurement device 96 or to calculate some of these on the basis of the operating conditions of the gas turbine system, and use the obtained exhaust gas characteristics for controlling the flow rate controllers 82 and 88. A further possibility is to use, for the same purpose, the characteristics, temperature, flow rate and/or pressure, of the produced steam as measured by sensor 98. Moreover, one can measure, e.g., $SO_2$ and $NO_x$ levels of the exhaust gas by sensor 100 and use these for the initial adjustment of gas input to the process gas inlet 18.

The above-described control concepts relate to continuous adjustment needs due to gradual changing of the operating conditions of gas turbine combustor 52. However, in the combined cycle power generation plant 10, sudden changes may also arise, which can be compensated for according to the present invention. As an example, the fuel introduced to the gasifier 58 may be changed to another, which changes the characteristics of the exhaust gas. In this type of change, the characteristics of the process gas can be, at least to a large extent, restored by changing the flow rates of the fresh air through inlet line 80 and the flue gas through return line 86.

Another possibility is that, for some reason, the gasifier 58 is taken out of use, and combustor 52 is switched to operate with natural gas or some other fuel. This will change, to some extent, the characteristics of the process gas and may lead to less than optimal performance of the boiler. However, the present invention provides the ability to operate the boiler with high efficiency and low emissions also when the system is used without a gasifier.

The biggest change in the operating mode is when the gas turbine 46 is, for some reason, taken out of use. Then, there is no gas turbine exhaust gas available, and, in order to maintain high performance operation of the boiler 12, flow rate controllers 82 and 88 can be used to simulate the gas turbine exhaust gas. However, if, in the stand-alone mode of the boiler 12, the fuel feed rate is increased to compensate for the lower process gas temperature, the oxygen content of the process gas can be adjusted accordingly.

A novel combined cycle power generation system and method of operating such a system have been described above. While the invention has been illustrated with respect to specific embodiments, it will be understood that numerous changes and modifications could be made thereto. Thus, the invention is intended to cover various modifications and equivalent arrangements included within the scope of the appended claims.

We claim:

1. A method of operating a combined cycle power generation plant, said method comprising:

providing a boiler having a furnace for combusting a first fuel to produce flue gas and for producing steam;

conducting the flue gas through a flue gas duct to the environment;

supplying process gas to the furnace;

driving a steam turbine by the steam to generate power;

combusting, in a combustor, a second fuel to produce exhaust gas;

expanding the produced exhaust gas in a gas turbine to generate power;

passing the exhaust gas from the gas turbine to the process gas supply;

recirculating a portion of the flue gas from the flue gas duct to the process gas supply;

controlling the rate of recirculation of the flue gas by a first controller;

supplying fresh air to the process gas supply;

controlling the rate of fresh air supply by a second controller;

supplying a selected amount of first fuel to the furnace;

supplying a selected amount of second fuel to the combustor;

measuring the operating conditions of the combustor, wherein the boiler is designed to provide, in first operating conditions of the combustor, effective steam production and low emissions when the first and second controllers minimize the rate of flue gas recirculation and fresh air supply, respectively, and the exhaust gas is used alone or as a major portion of the process gas;

controlling, in conditions other than the first operating conditions of the combustor, the first and second controllers to obtain at least nearly as effective steam production and as low emissions as in the first operating conditions; and basing the control of the first and second controllers on the measured operating conditions in said step of controlling in conditions other than the first operating conditions.

2. A method in accordance with claim 1, further comprising gasifying, in a high pressure gasifier, third fuel to produce fuel gas, and using the fuel gas as the second fuel.

3. A method in accordance with claim 2, wherein the boiler is a fluidized bed boiler.

4. A method in accordance with claim 3, further comprising producing char in the gasifier, and using the char as the first fuel.

5. A method in accordance with claim 2, wherein the gasifier is a fluidized bed gasifier.

6. A method in accordance with claim 5, wherein the boiler is a circulating fluidized bed boiler and the gasifier is a circulating fluidized bed gasifier.

7. A method in accordance with claim 1, wherein in the first operating conditions the combustor is in operation and in the conditions other than the first operating conditions the combustor is not in operation.

8. A method in accordance with claim 2, wherein in the first operating conditions the gasifier and the combustor are in operation and in the conditions other than the first operating conditions the gasifier and the combustor are not in operation.

9. A method in accordance with claim 2, wherein in the first operating conditions the gasifier is in operation and the fuel gas is used as the second fuel, and in the conditions other than the first operating conditions the gasifier is not in operation and another fuel is used as the second fuel.

10. A method in accordance with claim 9, further comprising using natural gas as the second fuel in the conditions other than the first operating conditions.

11. A method in accordance with claim 1, wherein said measuring step includes measuring at least one of ambient air temperature, pressure and humidity, and further comprising basing the control of the first and second controllers on the measurement in said step of controlling in conditions other than the first operating conditions.

12. A method in accordance with claim 1, wherein in the first operating conditions the process gas has a first mass flow rate, and said step of controlling in conditions other than the first operating conditions comprises controlling the first controller so as to decrease the change of the mass flow rate from the first mass flow rate.

13. A method in accordance with claim 1, further comprising measuring the oxygen content of the process gas, and controlling the second controller on the basis of the measured oxygen content in said step of controlling in conditions other than the first operating conditions.

14. A method in accordance with claim 1, further comprising measuring the residual oxygen in the flue gas, and controlling the second controller to obtain a preselected amount of residual oxygen in said step of controlling in conditions other than the first operating conditions.

15. A combined cycle power generation plant comprising:
a boiler for producing steam, said boiler comprising a furnace for combusting a first fuel to produce flue gas, a back-pass for receiving the produced flue gas and a flue gas duct for passing the flue gas from said back-pass to the environment;
a process gas supply for supplying process gas to said furnace;
a steam turbine for receiving and being driven by the steam to generate power;
a combustor for combusting a second fuel to produce exhaust gas, wherein said boiler is designed to have a geometry and heat transfer surfaces located so as to provide effective steam production and low emissions to the environment in first operating conditions of said combustor when using exhaust gas alone or as a major portion of process gas being supplied to said boiler;
a gas turbine for expanding the exhaust gas from said combustor to generate power and for passing the exhaust gas to said process gas supply;
a return line for recirculating a portion of the flue gas from said flue gas duct to said process gas supply;
a first controller for controlling a rate at which the flue gas is recirculated in said return line;
a supply for supplying fresh air to said process gas supply;
a second controller for controlling a rate at which the fresh air is supplied by said supply;
a master controller for controlling said first and second controllers so as to maintain at least nearly as effective steam production and as low emissions to the environment in conditions other than said first operating conditions of said combustor;
means for measuring the operating conditions for said combustor; and
means for controlling said first and second controllers on the basis of the measured operating conditions.

16. A combined cycle power plant in accordance with claim 15, further comprising a high pressure gasifier for gasifying a third fuel to produce fuel gas, which can be used as the second fuel.

17. A combined cycle power plant in accordance with claim 15, wherein said boiler is a fluidized bed boiler.

18. A combined cycle power plant in accordance with claim 16, wherein said boiler is a fluidized bed boiler and said gasifier also produces char, which is used as the first fuel.

19. A combined cycle power plant in accordance with claim 16, wherein said gasifier is a fluidized bed gasifier.

20. A combined cycle power plant in accordance with claim 19, wherein said boiler is a circulating fluidized bed boiler and said fluidized bed gasifier is a circulating fluidized bed gasifer.

21. A combined cycle power plant in accordance with claim 15, wherein said means for measuring the operating conditions of said combustor includes means for measuring at least one of ambient air temperature, pressure and humidity.

22. A combined cycle power plant in accordance with claim 15, further comprising:
means for measuring the mass flow of the process gas; and
means for controlling said first controller on the basis of the measured mass flow rate of the process gas.

23. A combined cycle power plant in accordance with claim 15, further comprising:
means for measuring the oxygen content of the process gas; and
means for controlling said second controller on the basis of the measured oxygen content of the process gas.

24. A combined cycle power plant in accordance with claim 15, further comprising:
means for measuring the residual oxygen content of the flue gas; and
means for controlling said second controller on the basis of the measured residual oxygen content of the flue gas.

* * * * *